United States Patent [19]

Berges

[11] Patent Number: 5,338,167
[45] Date of Patent: Aug. 16, 1994

[54] DRY-RUNNING VACUUM PUMP

[75] Inventor: Hanns-Peter Berges, Köln, Fed. Rep. of Germany

[73] Assignee: Leybold Aktiengesellschaft, Hauau, Fed. Rep. of Germany

[21] Appl. No.: 66,079

[22] PCT Filed: Jan. 31, 1992

[86] PCT No.: PCT/EP92/00210
§ 371 Date: May 25, 1993
§ 102(e) Date: May 25, 1993

[87] PCT Pub. No.: WO92/14059
PCT Pub. Date: Aug. 20, 1992

[30] Foreign Application Priority Data

Feb. 1, 1991 [EP] European Pat. Off. ........ 91101332.4

[51] Int. Cl.⁵ .............................................. F01C 19/00
[52] U.S. Cl. ..................................... 418/104; 384/606; 384/607; 384/617
[58] Field of Search ............. 418/9, 104; 277/57, 277/58; 384/606, 607, 617

[56] References Cited

U.S. PATENT DOCUMENTS

| 4,940,398 | 7/1990 | Berges et al. ............... 417/410 |
| 4,983,107 | 1/1991 | Steffens et al. .............. 418/9 |
| 5,051,007 | 9/1991 | Maddox et al. .............. 384/606 |

FOREIGN PATENT DOCUMENTS 0290662 11/1988 European Pat. Off. .

Primary Examiner—Louis J. Casaregola
Assistant Examiner—Charles G. Freay
Attorney, Agent, or Firm—Felfe & Lynch

[57] ABSTRACT

The invention relates to a dry-running vacuum pump (1) with at least one vertically disposed shaft (2, 3) which is mounted in an upper bearing plate (14) by means of a lubricated rolling bearing (27) situated in an open-topped pot-like component (51); in order to reduce the number of gaps in the area of this bearing (27) it is proposed that with the open-topped pot-like component (51) there be associated an open-bottomed pot-like component (54) fastened to the housing, the wall (55) of which reaches into the pot-like component (51) on the shaft, the rolling bearing's ring (62) that is fixed to the housing being supported on the inside of the said wall.

7 Claims, 2 Drawing Sheets

DRY-RUNNING VACUUM PUMP

BACKGROUND OF THE INVENTION

The invention relates to a dry-running vacuum pump with at least one vertically disposed shaft which is mounted in a top bearing plate by means of a lubricated rolling bearing situated in an open-topped pot-like component.

"Dry-running" vacuum pumps are pumps whose pump chambers contain no lubricant or sealants. Their advantage lies in the fact that they can produce vacuums completely free of hydrocarbons. However, it is impossible to dispense with the lubrication of the bearings of the shafts which bear the pistons rotating in the pump chambers. In dry-running pumps, therefore, it is necessary to assure an effective separation of the bearing chambers from the pump chambers.

A dry-running twin-shaft vacuum pump of the kind described above is disclosed in U.S. Pat. No. 290,662. To achieve separation of the upper bearing chambers from the adjacent pump chambers it is proposed to equip the upper ends of the shafts with an open-topped, pot-like component which traps bearing grease issuing from the bearings. The rolling bearings situated within the pot have a rotating outer ring which is held on the inner wall of the pot-like component. The stationary inner ring rests on a stump affixed to the housing and reaching into the pot-like component. In this system—in comparison with ordinary shaft bearings—there is a separate component between the shaft itself and the bearing ring rotating with the shaft, so that additional seams are present which can impair any correct shaft guidance.

The present invention is addressed to the problem of creating a vacuum pump of the kind described above, in which despite the presence of a pot-like component at the upper end of the shaft any interference with the shaft guidance described above will be avoided.

SUMMARY OF THE INVENTION

According to the invention this problem is solved by the fact that a pot-like component fastened to the housing and open at the bottom is associated with the open-topped pot-like component fastened to the upper shaft end below the rolling bearing, and its wall reaches into the open-topped pot-like component on the shaft, and the roller bearing's stationary ring on the housing is held on the inside of this wall. In this system the advantage is that the shaft—as in a conventional shaft bearing—is in direct contact with the co-rotating inner ring of the roiling bearing; in other words, no additional components or seams are present to impair the shaft guidance. Another advantage is that the result is a compact design, since both the inside and the outside of the pot-like component rotating with the shaft can be used for the formation of gap seals. Of the two gap seals situated coaxially one inside the other (not one following the other axially) in the subject matter of the invention, the inner one lies within the rotating pot-like component, so that any lubricant getting into this gap seal is trapped inside of the pot.

BRIEF DESCRIPTION OF THE DRAWINGS

Additional advantages and details of the invention are to be explained with the aid of the embodiments represented in FIGS. 1 and 2.

DESCRIPTION OF THE PREFERRED EMBODIMENTS

Figure 1:
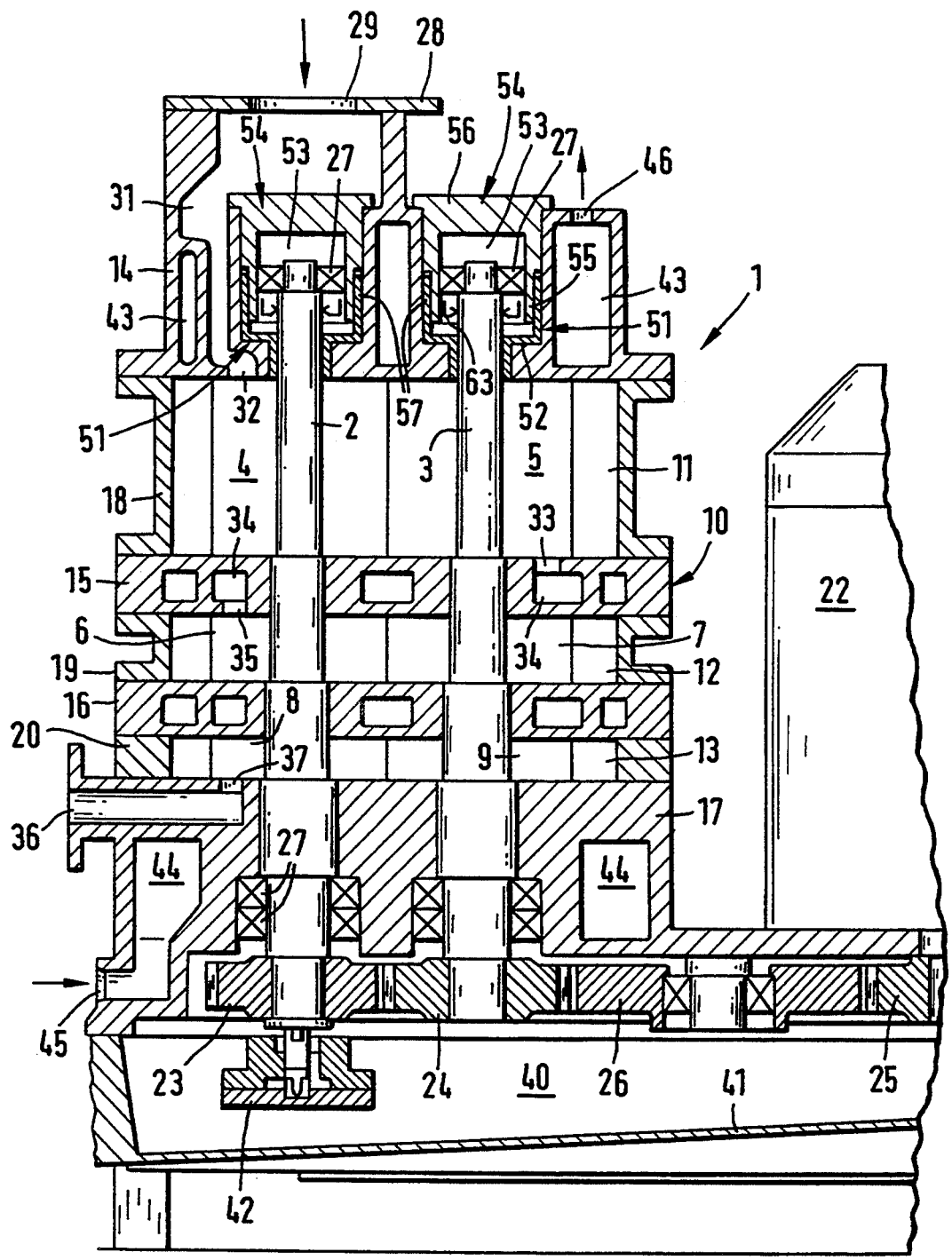
FIG. 1 shows a twin-shaft vacuum pump with upper shaft bearings according to the invention, and FIG. 2 an enlarged section through a shaft bearing according to the invention.

The pump shown in FIG. 1 is a three-stage vacuum pump 1 with two shafts 2 and 3 as well as three pairs of rotors 4–5, 6–7 and 8–9. The axial length of the rotors decreases from the suction end to the discharge end. The rotary pistons are of the claw type (Northey, cf., e.g., Eu-A-290,662) and rotate in the pump chambers 11, 12 and 13 which are formed by the plates 14 to 17 and the housing rings 18 to 20. The plates and housing rings form a housing.

The shafts 2 and 3 are vertically disposed. This is true also of the motor 22 disposed next to the pump housing. Below the bottom bearing plate 17 the shafts 2 and 3 are equipped with gears 23 and 24 of equal diameter, which serve for the synchronization of the motion of the rotor pairs 4–5, 6–7 and 8–9. The motor 22 also has at its bottom a gear 25. The driving connection is established by an additional gear 26 which is engaged with gears 24 and 25.

In the upper bearing plate 14 and lower bearing plate 17 the shafts 2 and 3 are supported on roll.ing bearings 27. The upper bearing plate 14 is equipped with a horizontally disposed connecting flange 28 which forms the inlet 29 of the pump. The inlet passage 31 opens at its end (opening 32) in the pump chamber 11 of the first stage. The outlet opening at the end of the first stage is marked 33 and leads into the connecting passage 34. The connecting passage 34 in the plate 15 is in communication with the inlet opening 35 of the second stage. The bearing plate 16 is shaped accordingly. Under the bottom (third) pump stage is the outlet 36, which is in communication with the end outlet opening 37 in the bottom bearing plate 17.

Under the system consisting of pump housing and motor is an oil-containing chamber 40 formed by a common oil pan 41. An oil pump 42 connected to shaft 2 reaches into this oil pan. Lubricant passages, not shown in detail, run from the oil pump to the parts of the pump (bearings, points of engagement of the gears 23 to 26, shaft seals or the like) which require oil lubrication. The bearings 27 at the upper ends of the shafts are preferably greased.

The embodiment of the three-stage twin-shaft vacuum pump represented is water-cooled. For this purpose cooling water passages 43 and 44 are provided in the side plates 14 and 17. The cooling water inlet and outlet are identified at 45 and 46. The cooling water inlet 45 is at the lowermost point of the passage system 43 and 44, so that easy drainage of coolant water is possible and complete removal of it is assured.

In accordance with the proposal of the invention, the upper shaft ends are equipped each with a co-rotating, open-topped pot-like component 51 through whose bottom 52 the shafts 2 and 3 extend into the bearing chambers 53. Open-bottomed pot-like components 54 affixed to the housing are associated with the pot-like components 51 and their walls 55 extend into the open-topped pot-like components 51, and their covers 56 close off the bearing chambers 53. The walls 57 of the rotating pot-like components 51 form with the bearing plate 14, and with the outer sides of the walls 55 of the components 54 fixed to the housing, the gap seals 58 and 59 (cf. FIG. 2) which will be explained in conjunction with FIG. 2. The bearing rings 61 and 62 (cf. FIG. 2) of bearings 27 are held on the shafts 2 and 3 themselves and on the inner sides of the walls 55 of the components 54 fixed to the housing. At the bottom the bearing chambers 53 are sealed off each by a radial shaft sealing ring 63.

Figure 2:
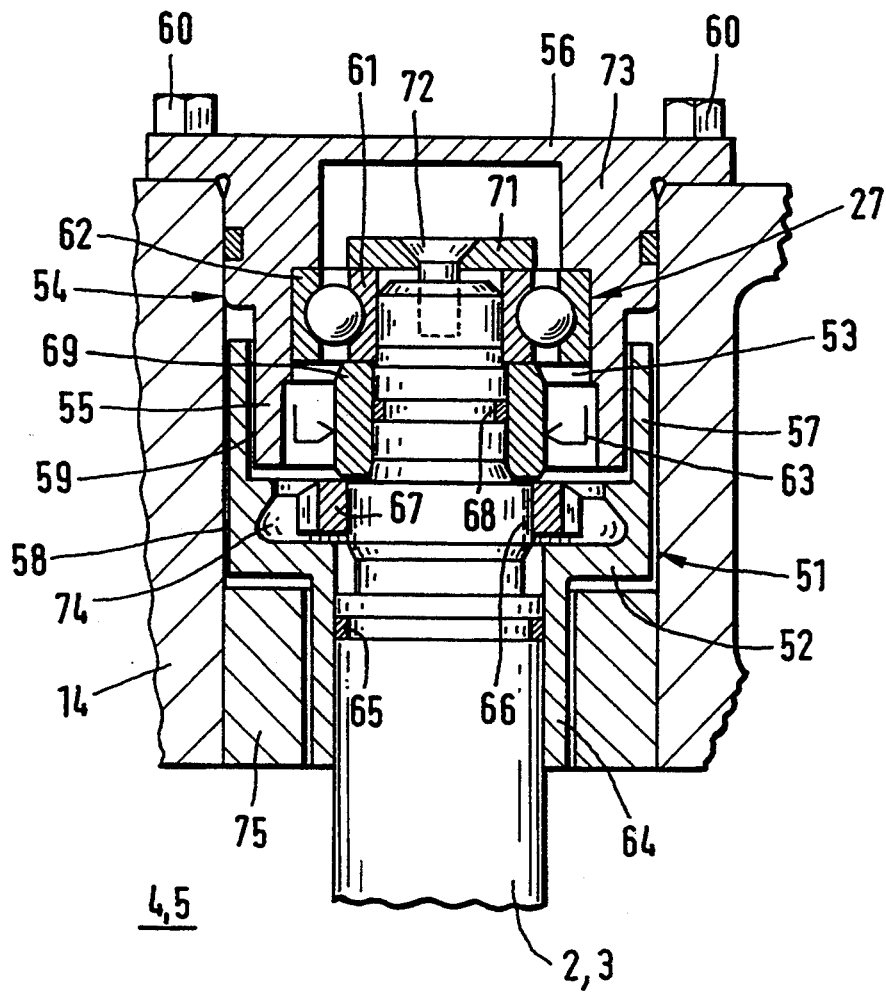

It can be seen from the detailed embodiment represented in FIG. 2 that the pot-like component 51 is pressed with a short tubular section 64 sealingly onto the shaft 2, 3 (sealing ring 65). Above the pot bottom 52 the shaft 2, 3 has a screw thread 66 with the nut 67. This permits the shaft to be tightened onto its rotors and onto the pot-like component 51. Above the thread 66 the shaft 2, 3 has a reduced diameter. The thread 66 is followed by a bushing 69 forced sealingly (sealing ring 68) onto the shaft 2, 3, for the radial shaft sealing ring 63 and the bearing 27 with its rotating inside ring 61. By means of the disk 71 and the screw 72 the bearing ring 61 and the bushing 69 are fastened on the upper end of the shaft 2, 3. On account of this method of fastening independently of the shaft mounting it is possible to replace the bearing 27 and the radial shaft sealing ring 63 without having to loosen the rotor mounting. The pot-like component 54 is fastened at its upper part (cover 56) to the bearing plate 14 by means of the screws 60 and defines the position of the outer bearing ring 62.

The purpose of the pot-like component 51 is to trap lubricant issuing from the bearing 27 in case of failure of the radial shaft sealing ring 63. In its bottom part it is provided with an undercut 74 which serves as a pocket to hold the lubricant by centrifugal force. The gap seals 59 and 58, coaxially spaced one inside the other, follow next in the direction of the pump chamber 4 and assure a reliable separation. In addition, the outer sides of the bottom 52 and of the short tubular section 64, together with a ring 75 shrink-fitted into the bearing plate 14, form gaps which assist in providing the desired separation between the pump chamber 4, 5 and bearing ring 53.

I claim:
1. Dry-running vacuum pump comprising:
at least one vertically disposed rotatable shaft;
an upper bearing plate;
a lubricated roller bearing;
an open-top pot-like component fastened on the shaft, the lubricated roller bearing being situated in the open-top pot-like component, and the lubricated roller bearing mounting the shaft in the upper bearing plate;
a housing;
an open-bottom pot-like component having an inside and being affixed to the housing and associated with the open-top pot-like component and having a wall reaching into the open-top pot-like component; and
the roller bearing having a housing-mounted bearing ring held on the inside of the open-bottom pot-like component.

2. Pump according to claim 1, in which the open-top pot-like component has a cylindrical wall having an inside and an outside and both the inside and the outside of the cylindrical wall of the open-top pot-like component rotatable with the shaft form gap seals with the cylindrical wall of the open-bottom pot-like component affixed to the housing, and with the housing.

3. Pump according to claim 1, which includes a radial shaft sealing ring which is supported on the shaft and on the wall of the open-bottom pot-like component affixed to the housing and defines a bearing chamber sealed by means of the radial shaft sealing ring.

4. Pump according to claim 3, which includes a bushing for the radial shaft sealing ring and means for mounting the bearing and the bushing for the radial shaft sealing ring on an upper end of the shaft and which pump includes means for securing the shaft to a rotor, the bearing mounting means and the bushing being independent of the securing means.

5. Pump according to claim 1, in which the open-top pot-like component has in a bottom area an undercut forming a trap pocket.

6. Pump according to claim 1, which includes a component affixed to the housing in which the open-top pot-like component has a bottom and which includes a short tubular portion situated at the bottom thereof and in which the open-top pot-like component is held sealingly on the shaft by means of the short tubular portion and in which an outside of the bottom and of the short tubular portion forms gap seals with a component affixed to the housing.

7. Pump according to claim 1, which is a twin-shaft vacuum pump with rotor pairs of the claw type.

* * * * *